(12) United States Patent
Sakuraba et al.

(10) Patent No.: US 8,194,851 B2
(45) Date of Patent: Jun. 5, 2012

(54) VOICE PROCESSING APPARATUS, VOICE PROCESSING SYSTEM, AND VOICE PROCESSING PROGRAM

(75) Inventors: Yohei Sakuraba, Kanagawa (JP); Yasuhiko Kato, Kanagawa (JP)

(73) Assignee: Sony Corporation (JP)

( * ) Notice: Subject to any disclaimer, the term of this patent is extended or adjusted under 35 U.S.C. 154(b) by 760 days.

(21) Appl. No.: 12/316,112

(22) Filed: Dec. 9, 2008

(65) Prior Publication Data

US 2009/0154692 A1 Jun. 18, 2009

(30) Foreign Application Priority Data

Dec. 13, 2007 (JP) ................................ P2007-322517

(51) Int. Cl.
*H04M 9/08* (2006.01)
*H04R 29/00* (2006.01)
*H04B 15/00* (2006.01)

(52) U.S. Cl. ......... 379/406.06; 379/406.08; 379/406.14; 381/59; 381/94.7

(58) Field of Classification Search ............. 379/406.06, 379/406.08, 406.14; 381/59, 66, 93, 94.7
See application file for complete search history.

(56) References Cited

U.S. PATENT DOCUMENTS

| | | | | |
|---|---|---|---|---|
| 5,410,595 | A * | 4/1995 | Park et al. ................ | 379/406.08 |
| 5,761,318 | A * | 6/1998 | Shimauchi et al. ............ | 381/66 |
| 6,424,720 | B1 * | 7/2002 | Thomas et al. ................. | 381/66 |
| 6,654,468 | B1 * | 11/2003 | Thompson ....................... | 381/92 |
| 2005/0080616 | A1 * | 4/2005 | Leung et al. ............... | 704/200.1 |
| 2006/0034447 | A1 * | 2/2006 | Alves et al. ............. | 379/406.01 |
| 2006/0104458 | A1 * | 5/2006 | Kenoyer et al. ................. | 381/92 |
| 2006/0262942 | A1 * | 11/2006 | Oxford ........................... | 381/66 |

FOREIGN PATENT DOCUMENTS

EP 1855456 A1 * 11/2007
JP 2003-271167 A 9/2003

* cited by examiner

*Primary Examiner* — Md S Elahee
*Assistant Examiner* — Jeffrey Lytle
(74) *Attorney, Agent, or Firm* — Lerner, David, Littenberg, Krumholz & Mentlik, LLP

(57) ABSTRACT

A voice processing apparatus includes a band dividing portion dividing a first voice signal generated by a first microphone and a second voice signal generated by a second microphone into predetermined frequency bands, a sound source segregating portion segregating an echo component of a voice emitted by a first sound source included in a voice emitted by a second sound source in each of the predetermined frequency bands based on the power of the first and second microphones, and a band synthesis portion synthesizing the first and second voice signals from which the echo component of the first sound source has been segregated by the sound source segregating portion into a voice signal including the voice emitted by the first sound source and a voice signal including the echo component of the first sound source.

5 Claims, 2 Drawing Sheets

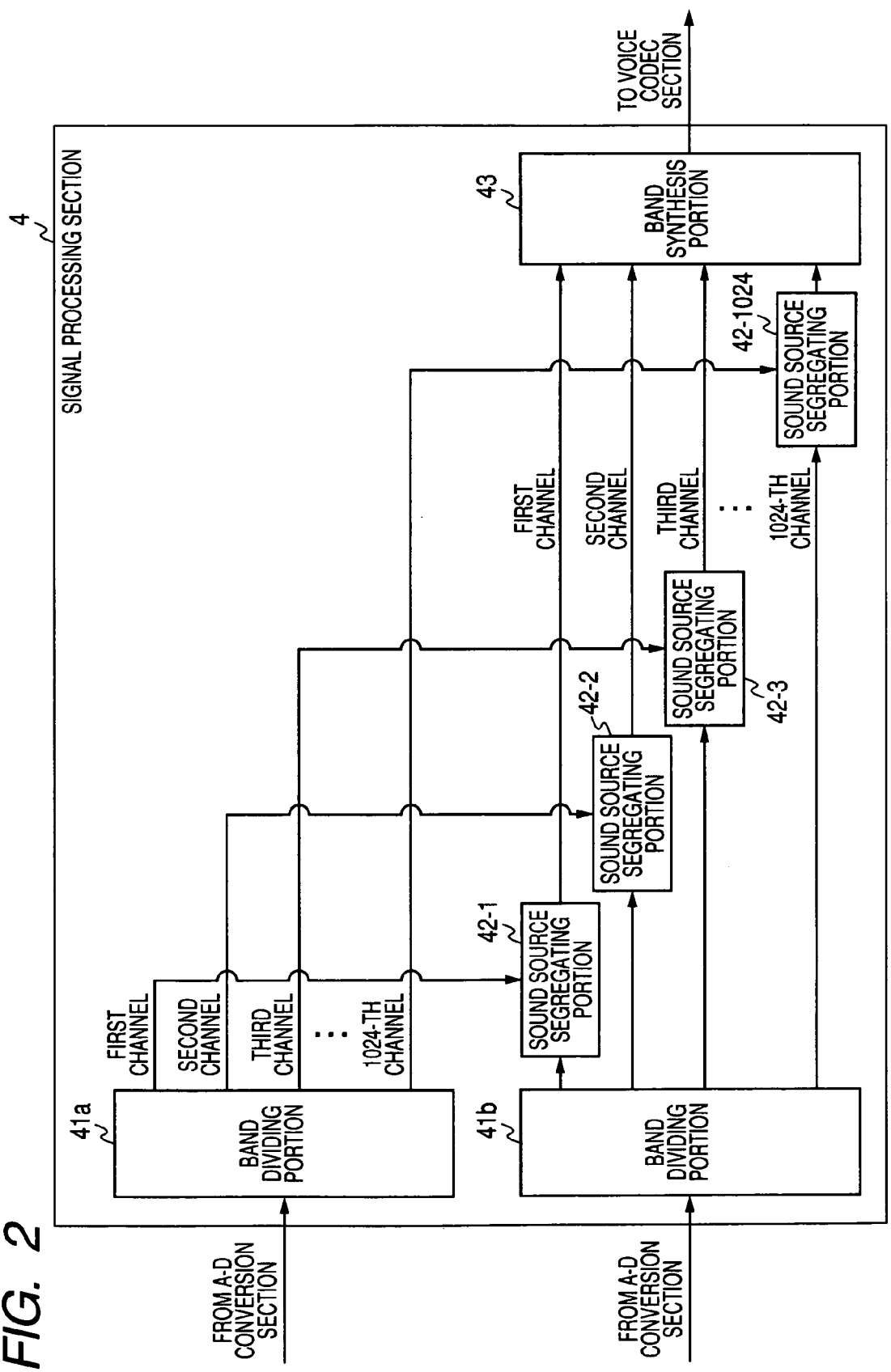

VOICE PROCESSING APPARATUS, VOICE PROCESSING SYSTEM, AND VOICE PROCESSING PROGRAM

CROSS REFERENCES TO RELATED APPLICATIONS

The present application claims priority from Japanese Patent Application No. JP 2007-322517, filed in the Japanese Patent Office on Dec. 13, 2007, the entire content of which is incorporated herein by reference.

BACKGROUND OF THE INVENTION

1. Field of the Invention

The present invention relates to a voice processing apparatus, a voice processing system, and a voice processing program for processing voices collected in environments such as conference rooms where a plurality of persons speak to suppress the influence of echo and howling.

2. Description of the Related Art

In order to allow a conference held between distant places to proceed smoothly, for example, a video conference system has been installed in the different conference rooms (hereinafter referred to as first and second conference rooms) to allow people to speak to each other with their appearances displayed. Such a video conference system (hereinafter also referred to as "sound-reinforced communication system") includes a plurality of image/voice processing apparatus for displaying situations in the different conference rooms to allow the participants to have views of each other and for emitting sounds representing the contents of speech of the participants. In the following description, it is assumed that an image/voice processing apparatus is provided in each of the first and second conference rooms.

The image/voice processing apparatus includes a microphone collecting a voice during the conference, a camera imaging the participant, a signal processing section performing a predetermined process on the voice of the participant collected by the microphone, a display section displaying a view of the participant speaking in the different conference room, and a speaker emitting a sound representing the contents of speech of the participant.

The image/voice processing apparatus provided in the conference rooms are connected to each other through a communication network. The apparatus record image/voice data and transmit and receive the data to and from each other to display the situation in each conference room and to emit sounds representing the contents of speech of the participants.

In such a video conference system, a sound emitted by a speaker is reflected by a wall or the like and input to a microphone. When no processing is carried out on such an input sound, the sound data is transmitted to the image/voice processing apparatus again. As a result, a person in the second conference room may encounter a phenomenon in which the person hears his or her voice from the speaker with some delay just like an echo. Such a phenomenon is referred to as "echo". When there is significant echo, a sound emitted by a speaker is repeatedly input to a microphone, and the sound is therefore looped through the sound-reinforced communication system to cause howling.

A technique referred to as echo cancellation has been used to prevent echo and howling. In general, an echo canceller first measures impulse response between a speaker and a microphone using an adaptive filter. When sounds are input from the speaker to the microphone, the echo canceller generates a pseudo echo by convolving the impulse response with a reference signal generated by the speaker. The pseudo echo is subtracted from the sounds input to the microphone. Unnecessary sounds which can cause echo or howling can be eliminated by subtracting the pseudo echo as thus described.

JP-A-2003-271167 (Patent Document 1) discloses a technique for segregating a stereo signal, which is a mixture of signals collected in different channels, into signals in the original channels with a low signal-to-noise ratio and a small amount of calculations.

SUMMARY OF THE INVENTION

Impulse response between a speaker and a microphone can be easily changed only by a change in a relationship between voice reflections which can occur when participants of a video conference move their bodies. It takes some time for an adaptive filter to follow up such a change and to generate a pseudo echo by calculating impulse response accordingly. For example, it takes about 10 seconds to obtain a voice emitted by a sound source and a pseudo echo, from a sound directly coming from a speaker and reflected sounds coming from walls. A pseudo echo can not be properly generated by an adaptive filter during the period from the occurrence of a change in the sound-reinforced communication system (e.g., when a participant wearing a pin-type microphone moves) until the adaptive filter is enabled for echo cancellation. As a result, when there is a change in impulse response, a loud echo may be returned, which can result in howling in severe cases.

In general, an adaptive filter performs calculations in an amount greater than that of calculations involved in fast Fourier transform (FFT) or calculations performed by a filter bank. For this reason, an adaptive filter cannot perform calculations at a high speed when used in a signal processing apparatus having a low processing capability. Let us assume that an adaptive filter is used to carry out echo cancellation in a spacious place such as a gymnasium. Then, a speaker and a microphone will be at a great distance from each other, and there will be a long reverberation time. Further, the adaptive filter will require a great tap length. Thus, a greater amount of calculations will be required, and an effective solution for such a problem has been sought.

Techniques proposed as alternatives to the use of an adaptive filter include that disclosed in Patent Document 1. In the related art, instantaneous values are used to obtain matrix parameters. However, when instantaneous values are directly used to obtain matrix parameters, variation of the instantaneous values becomes a problem. For this reason, it is difficult to accurately perform a sound source segregation process for segregating echoes and noises from sounds collected from a sound source (e.g., a person who is speaking).

Under such circumstances, it is desirable to accurately eliminate echo components included in collected sounds.

An embodiment of the invention is preferable in processing voice signals generated by a plurality of microphones in a situation in which a voice emitted by a first sound source is collected by the plurality of microphones and in which a voice emitted by a second sound source including the voice emitted by the first sound source and collected as an echo component is collected by the plurality of microphones. Specifically, at least a first voice signal and a second voice signal generated by at least a first microphone and a second microphone among the plurality of microphones, respectively, are divided into predetermined frequency bands. Based on the power of the first and second microphones, the echo component of the voice emitted by the first sound source included in the voice emitted by the second sound source is segregated in each of the predetermined frequency bands of the first and second voice signals thus divided. The first and second voice signals from which the echo component of the first sound source has been segregated are synthesized into a voice signal including the voice emitted by the first sound source and a voice signal including the segregated echo component of the first sound source.

Thus, a voice signal is obtained with an echo component eliminated.

According to the embodiment of the invention, for example, when the voice of a speaking person acting as the first sound source and a voice emitted by a speaker acting as the second sound source are collected by the plurality of microphones, an echo component of the voice of the speaking person can be eliminated from the voice collected from the speaker. Therefore, a voice signal formed by only the voice of the speaking person acting as the first sound source can be obtained without echo and howling even in a communication system in which collected voices have been accompanied by echoes according to the related art. The embodiment is therefore advantageous in that it provides a voice signal having high quality.

BRIEF DESCRIPTION OF THE DRAWINGS

FIG. 2 is a block diagram showing an example of an internal configuration of a signal processing section according to the embodiment of the invention.

DETAILED DESCRIPTION OF THE INVENTION

Figure 1:
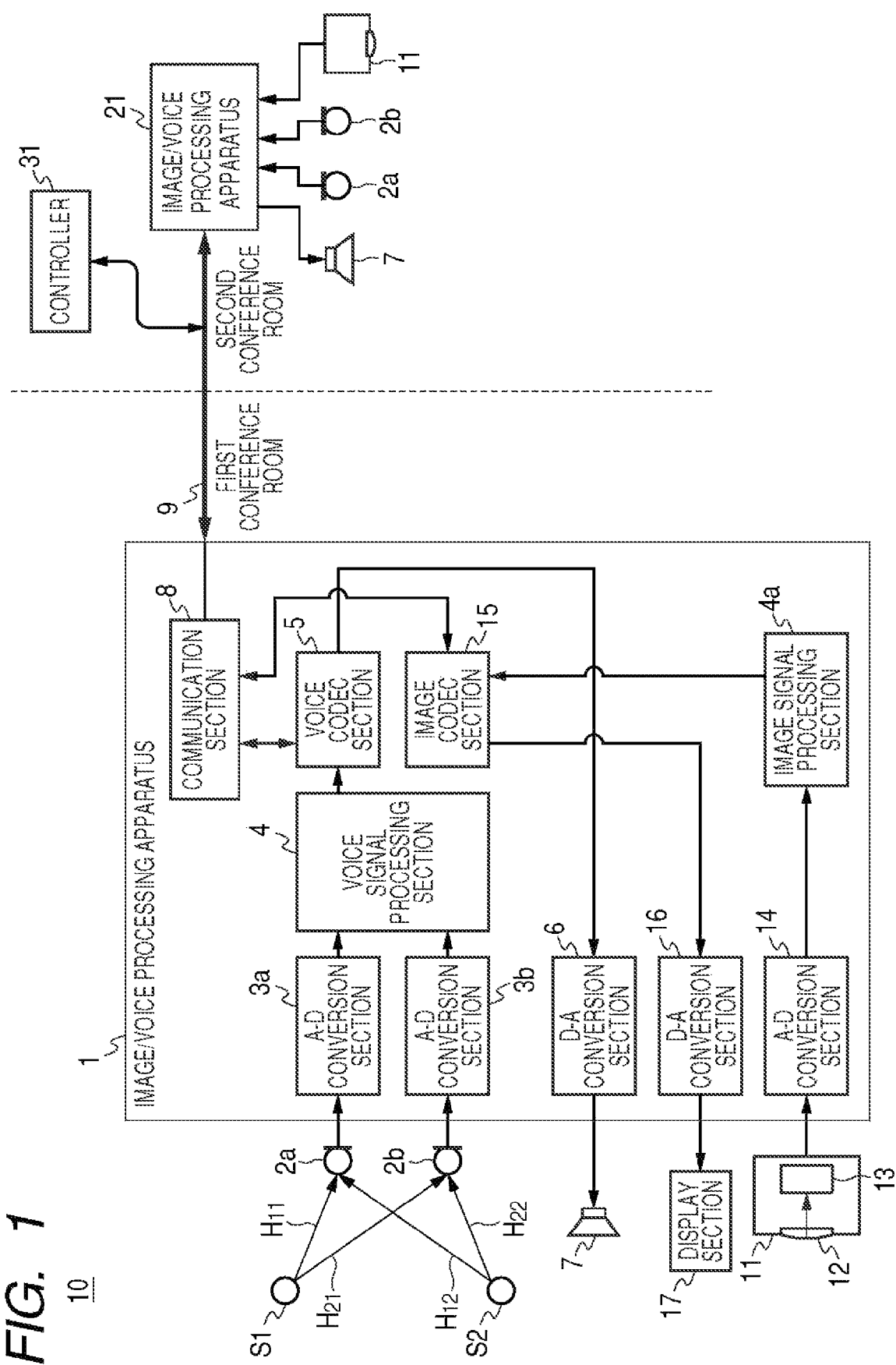
FIG. 1 is a block diagram showing an example of an internal configuration of a video conference system according to an embodiment of the invention.

An embodiment of the invention will now be described with reference to the accompanying drawings. The present embodiment is an example in which an image/voice processing system for processing voice data and image data is used as a video conference system 10 allowing real-time transmission and reception of image data and voice data between locations remote from each other.

FIG. 1 is a block diagram showing an example of a configuration of the video conference system 10.

Image/voice processing apparatus 1 and 21 capable of processing image data and voice data are provided in first and second conference rooms, respectively, the conference rooms being located in places distant from each other. The image/voice processing apparatus 1 and 21 are connected to each other through a digital communication network 9 such as Ethernet (a registered trademark) over which digital data can be communicated. The image/voice processing apparatus 1 and 21 are controlled in a centralized manner by a controller 31 controlling timing for data transmission through the communication network 9. Although the image/voice processing apparatus 1 and 21 installed in two locations (the first and second conference rooms) will be described below, image/voice processing apparatus may be installed in three or more locations.

An example of an internal configuration of the image/voice processing apparatus 1 will now be described. Since the image/voice processing apparatus 21 has a configuration substantially similar to that of the image/voice processing apparatus 1, internal blocks of the image/voice processing apparatus 21 will not be described in detail.

The image/voice processing apparatus 1 includes a first microphone 2a and a second microphone 2b which collect a voice emitted by a speaking person and generate an analog voice data. The image/voice processing apparatus 1 includes analog-digital (A-D) conversion sections 3a and 3b which amplify the analog voice data supplied from the first microphone 2a and the second microphone 2b with amplifiers (not shown) and convert the data into digital voice data. The apparatus also includes a voice signal processing section 4 performing a predetermined process on the digital voice data supplied from the analog-digital (A-D) conversion sections 3a and 3b.

Analog voice data are generated from voices collected by the first microphone 2a which is disposed near a person who is speaking and the second microphone 2b which is disposed near a speaker 7. With the first microphone 2a and the second microphone 2b, voices emitted by participants in the first conference room and voices emitted by the speaker 7 are collected and superposed on each other over the space intervening them. The analog voice data supplied by the first microphone 2a and the second microphone 2b are converted into 16-bit PCM (Pulse-Code Modulation) digital voice data sampled at, for example, 48 kHz by the analog-digital conversion sections 3a and 3b. The digital voice data obtained by the conversion are supplied to the signal processing section 4 one sample after another.

In the present embodiment, a speaking person (not shown) and the speaker 7 may be referred to as "a first sound source S1" and "a second sound source S2", respectively, based on functional similarity between them. A voice emitted by a speaking person is looped through the image/voice processing apparatus 1 and is emitted from the speaker 7. That is, a voice emitted from a second sound source S2 provided in a first location (a first conference room) among a plurality of locations includes a voice collected in a second location (a second conference room) in which the voice collected in the first location is emitted.

A first transfer characteristic $H_{11}(\omega)$ that the first microphone 2a has when collecting the voice emitted by the first sound source S1 and a second transfer characteristic $H_{21}(\omega)$ that the second microphone 2b has when collecting the voice emitted by the first sound source S1 are determined. Further, a third transfer characteristic $H_{12}(\omega)$ that the first microphone 2a has when collecting the voice emitted by the second sound source S2 and a fourth transfer characteristic $H_{22}(\omega)$ that the second microphone 2b has when collecting the voice emitted by the second sound source S2 are determined. The first to fourth transfer characteristics are parameters to be used for voice segregation at the signal processing section 4 as will be described later.

The signal processing section 4 is provided in the form of a digital signal processor (DSP). Details of processes performed by the signal processing section 4 will be described later.

The image/voice processing apparatus 1 includes a voice codec section 5 which codes digital voice data supplied from the signal processing section 4 into standard codes defined to be used for communication in the video conference system 10. The voice codec section 5 also has the function of decoding coded digital voice data received from the image/voice processing apparatus 21 through a communication section 8 which is a communication interface. The image/voice processing apparatus 1 also includes the digital-analog conversion section 6 which converts the digital voice data supplied from the voice codec section 5 into analog voice data and the speaker 7 which amplifies the analog voice data supplied from the digital-analog (D-A) conversion section 6 with an amplifier (not shown) to emit a voice.

The image/voice processing apparatus 1 also includes a camera 11 which images a speaking person to generate analog image data and an analog-digital conversion section 14 which converts the analog image data supplied from the camera 11 into digital image data. The digital image data obtained by the conversion at the analog-digital conversion section 14 are supplied to an image signal processing section 4a and subjected to a predetermined process at the section.

The image/voice processing apparatus 1 also includes an image codec section 15 which codes the digital image data subjected to a predetermined process at the signal processing section 4a, a digital-analog conversion section 16 which converts the digital image data supplied from the image codec section 15 into analog image data, and a display section 17 which amplifies the analog image data supplied from the digital-analog conversion section 16 with an amplifier (not shown) to display an image.

The communication section 8 controls communication of digital image/voice data between the apparatus 1 and the image/voice processing apparatus 21 that is the apparatus on the other end of the system and between the apparatus 1 and the controller 31. The communication section 8 packetizes the digital voice data coded by the voice codec section 5 using a predetermined coding method (e.g., MPEG (Moving Picture Experts Group)-4, AAC (Advanced Audio Coding), or G.728) and the digital image data coded by the image codec section 15 using a predetermined coding method according to a predetermined protocol. The packets are transmitted to the image/voice processing apparatus 21 over the communication network 9.

The image/voice processing apparatus 1 receives digital image/voice packets from the image/voice processing apparatus 21. The communication section 8 reconstructs data from the received packets and decodes the data at the voice codec section 5 and the image codec section 15. The decoded digital voice data are supplied through the D-A conversion section 6 to the speaker 7 which amplifies the data with an amplifier (not shown) to emit a voice. Similarly, the decoded digital image data are supplied through the D-A conversion section 16 to the display section 17 which amplifies the data with an amplifier (not shown) to display an image.

The display section 17 displays views of the participants of a meeting held in the first and second conference rooms on a split screen. As a result, even if the first and second conference rooms are far from each other, the participants can hold a meeting without feeling the distance of each other.

Next, an example of an internal configuration of the signal processing section 4 will be described with reference to the block diagram of FIG. 2. The signal processing section 4 of the present embodiment is characterized in that it performs a predetermined process on digital voice data.

The signal processing section 4 includes band dividing portions 41a and 41b which perform time domain to frequency domain conversion of a voice signal included in digital voice data supplied from each of the analog-digital conversion sections 3a and 3b and divide the band of the signal into 1024 channels, sound source segregating portions 42-1 to 42-1024 which perform sound source segregation on the band-divided voice signal by eliminating an echo component and a noise component included in the collected voice, and a band synthesis portion 43 which generates digital voice data by synthesizing the voice signal in each band from which an echo component and a noise component have been eliminated. The term "sound source segregation" also applies to an operation of eliminating only an echo component from a voice signal. The digital voice data synthesized by the band synthesis portion 43 are supplied to the voice codec section 5 and are subjected to a predetermined process at the section.

Analog voice data supplied from the first microphone 2a and the second microphone 2b are converted into digital voice data by the analog-digital conversion sections 3a and 3b. The digital voice data obtained by the conversion are sent to the band dividing portions 41a and 41b.

The band dividing portions 41a and 41b perform a band dividing process to divide a voice signal included in the digital voice data into each of predetermined frequency bands. For example, a Fourier transform is used at the band dividing process. The signal is subjected to time domain to frequency domain conversion using the Fourier transform. After the resultant signals are subjected to a predetermined process, an inverse Fourier transform may be performed to re-synthesize the signals into data in the time domain. The band dividing process performed by the band dividing portions 41a and 41b may employ techniques such as the use of DFT (Discrete Fourier Transform) filter banks as disclosed in Kazunobu Toguchi, *Subband Adaptive Filters with Perfect Reconstruction DFT Filter Banks*, IEICE Transaction, August 1996, Vol. J79-A No. 8 pp. 1385-1393. In the present embodiment, the band dividing portions 41a and 41b are provided in association with the first microphone 2a and the second microphone 2b, respectively. Alternatively, voice signals generated by a plurality of microphones may be divided into each of predetermined frequency bands using one band dividing portion.

Channel numbers are assigned to voice signals obtained by the band dividing at the band dividing portions 41a and 41b, for example, in the ascending order of the bands in which the channel of the lowest band is the first channel and the channel of the highest band is the 1024-th channel. Voice signals in the same channel (e.g., an n-th channel) output by the band dividing portions 41a and 41b are supplied to a sound source segregating portion 42-n. Therefore, voice signals in the first channel are supplied to the sound source segregating portion 42-1. Voice signals in the second channel are supplied to the sound source segregating portion 42-2. The process similarly repeats, and voice signals in the 1024-th channel output by the band dividing portions 41a and 41b are supplied to the sound source segregating portion 42-1024.

The sound source segregating portions 42-1 to 42-1024 perform sound source segregation based on the power of the first microphone 2a and the second microphone 2b. Specifically, an echo component of a voice emitted by the first sound source included in a voice emitted by the second sound source S2 is segregated in each of the predetermined frequency bands of the voice signals obtained as a result of band division at the band dividing portions 41a and 41b.

The sound source segregating portions 42-1 to 42-1024 also have the function of eliminating a stationary noise which steadily occurs with small fluctuations with time. In order to eliminate stationary noises from collected voices, the sound source segregating portions 42-1 to 42-1024 segregate first and second voice signals into a stationary signal including a noise component and a non-stationary signal including no noise component. The noise component included in the stationary signal is suppressed, and an echo component of the voice emitted by the first sound source included in the voice emitted by the second sound source is segregated from the non-stationary signal.

The band synthesis portion 43 receives voice signals obtained by the sound source segregation performed at the sound source segregating portions 42-1 to 42-1024. The portion 43 synthesizes a voice signal including the voice emitted by the first sound source in each of the predetermined frequency bands from the sound-source-segregated voice signals. Further, the portion 43 synthesizes a voice signal including the segregated echo component of the first sound source in each of the predetermined frequency bands. The band synthesis portion 43 transmits the synthesized voice signals to the voice codec section 5 as digital voice data in a form which can be processed by other processing sections.

In sound source segregating portions according to the related art (which correspond to the sound source segregating portions 42-1 to 42-1024 of the present embodiment), sound source segregation has been performed to obtain only a voice emitted by a speaking person by segregating an echo component included in the voice signal using a technique based on a sound source segregation method referred to as SAFIA (sound source segregation based on estimating incident Angle of each Frequency component of Input Signals Acquired by multiple microphones). Fundamental processes performed according to SAFIA are described in Mariko Aoki et al. *Improvement of Source Separation Method "SAFIA" under Reverberant Conditions*, September 2004, IEICE Transaction Vol. J87-A No. 9 pp. 1171-1186 and Mariko Aoki et al. *Separation of the Taraet Source Close to the Microphones and Noise Sources Far from the Microphones*, IEICE Transaction Vol. J88-A No. 4 pp. 468-479. According to the sound source segregation method in the related art, frequencies are selected based on only a power difference between microphones, and impulse response in a room is not identified unlike an adaptive process. Therefore, a small number of parameters are obtained, and the method is less vulnerable to changes that occur in a sound-reinforced communication system.

When sound source segregation is carried out according to the SAFIA method in the related art, matrix parameters $H(\omega)$ are obtained using Expression (1). Referring to the variables, $\omega$ represents a frequency; i represents time when the first microphone 2a and the second microphone 2b collect voices emitted by the first sound source S1 and the second sound source S2; $Th_1$ represents a first threshold; $Th_2$ represents a second threshold; and E represents a function representing an expected value. The matrix parameters $H(\omega)$ are a 2×2 mixed matrix whose elements are transfer characteristics (frequency responses) $H_{nm}(\omega)$ of voices from sound sources $S_m$ to microphones $_n$.

$H_{11}(\omega,i)$ represents a first transfer characteristic of a voice from the first sound source S1 to the first microphone 2a.

$H_{21}(\omega,i)$ represents a second transfer characteristic of a voice from the first sound source S1 to the second microphone 2b.

$H_{12}(\omega,i)$ represents a third transfer characteristic of a voice from the second sound source S2 to the first microphone 2a.

$H_{22}(\omega,i)$ represents a fourth transfer characteristic of a voice from the second sound source S2 to the second microphone 2b.

$$\frac{H_{21}(\omega)}{H_{11}(\omega)} = E\left\|\frac{H_{21}(\omega,i)}{H_{11}(\omega,i)}\right\| = E\left\|\frac{X_2(\omega,i)}{X_1(\omega,i)} > TH_1\right\| \quad (1)$$

$$\frac{H_{12}(\omega)}{H_{22}(\omega)} = E\left\|\frac{H_{12}(\omega,i)}{H_{22}(\omega,i)}\right\| = E\left\|\frac{X_1(\omega,i)}{X_2(\omega,i)} > TH_2\right\|$$

Let us assume that power obtained from a voice signal generated by the first microphone 2a is referred to as first power $X_1(n)$ and that power obtained from a voice signal generated by the second microphone 2b is referred to as second power $X_2(n)$. The first power $X_1(n)$ and the second power $X_2(n)$ are values which change with time and which are obtained by time-averaging over a predetermined period.

Sound source segregation is carried out by obtaining a first voice signal $Y_1(\omega,i)$ which changes with time and which is a voice emitted by the first sound source S1 and a second voice signal $Y_2(\omega,i)$ which is a voice emitted by the second sound source S2 using Expressions (2) and (3). The first voice signal $Y_1(\omega,i)$ is a voice signal including a voice of a speaking person that is a sound of interest. The second voice signal $Y_2(\omega,i)$ is a voice signal including a sound that is an echo component.

$$\begin{pmatrix} Y_1(\omega,i) \\ Y_2(\omega,i) \end{pmatrix} = \frac{1}{1 - \left(\frac{H_{21}(\omega,i)}{H_{11}(\omega,i)}\right)\left(\frac{H_{12}(\omega,i)}{H_{22}(\omega,i)}\right)} \begin{bmatrix} 1 & -\frac{H_{12}(\omega,i)}{H_{22}(\omega,i)} \\ -\frac{H_{21}(\omega,i)}{H_{11}(\omega,i)} & 1 \end{bmatrix} \begin{pmatrix} X_1(\omega,i) \\ X_2(\omega,i) \end{pmatrix} \quad (2)$$

Expression (2) is an equation for obtaining instantaneous values of the first voice signal $Y_1(\omega,i)$ and the second voice signal $Y_2(\omega,i)$.

$$\begin{pmatrix} Y_1(\omega,i) \\ Y_2(\omega,i) \end{pmatrix} = \begin{pmatrix} \frac{Y_1(\omega)}{X_1(\omega)} & 0 \\ 0 & \frac{Y_2(\omega)}{X_2(\omega)} \end{pmatrix} \begin{pmatrix} X_1(\omega,i) \\ X_2(\omega,i) \end{pmatrix} \quad (3)$$

Expression (3) is an equation for obtaining the first voice signal $Y_1(\omega,i)$ and the second voice signal $Y_2(\omega,i)$ by time-averaging the matrix parameters $H(\omega)$ obtained by Expression (1).

It is difficult to accurately segregate an echo component from a voice of a speaking person when the SAFIA method is used in an actual environment. For this reason, unlike the sound source segregation process according to the related art, when a sound source segregation process is carried out using the sound source segregating portions 42-1 to 42-1024 of the present embodiment, Expressions (4) to (6) shown below are used. Those expressions have variables similar to those of Expressions (1) to (3) to be used for the sound source segregation process according to the related art as described above. However, the frequency $\omega$ is a value determined for each of predetermined frequency bands obtained by the band dividing portions 41a and 41b. It is also to be noted that a function E is used to find an average of first values greater than a first threshold $TH_1$, the first values being second power $X_2(\omega)$ divided by first power $X_1(\omega)$ and another function E is used to find an average of second values greater than a second threshold $TH_2$, the values being the first power $X_1(\omega)$ divided by the second power $X_2(\omega)$.

$$\frac{H_{21}(\omega)}{H_{11}(\omega)} = E\left\|\frac{X_2(\omega)}{X_1(\omega)} > TH_1\right\| \quad (4)$$

$$\frac{H_{12}(\omega)}{H_{22}(\omega)} = E\left\|\frac{X_1(\omega)}{X_2(\omega)} > TH_2\right\|$$

Expression (4) is an equation to find ratios between the second transfer characteristic $H_{21}(\omega)$ and the first transfer characteristic $H_{11}(\omega)$ and between the third transfer characteristic $H_{12}(\omega)$ and the fourth transfer characteristic $H_{22}(\omega)$.

Matrix parameters $H(\omega)$ obtained by Expression (4) are values changing with time. According to Expression (4), the time-averaged ratio between the first power $X_1(n)$ and second power $X_2(n)$ is further time-averaged. Therefore, the time-averaged ratio between the first power $X_1(n)$ and the second power $X_2(n)$ obtained by the sound source segregating portions 42-1 to 42-1024 of the present embodiment is different from the time-averaged value of the ratio between the first power $X_1(n)$ and the second power $X_2(n)$ obtained according to the sound source segregation method in the related art.

$$\begin{pmatrix} Y_1(\omega) \\ Y_2(\omega) \end{pmatrix} = \frac{1}{1 - \left(\frac{H_{21}(\omega)}{H_{11}(\omega)}\right)\left(\frac{H_{12}(\omega)}{H_{22}(\omega)}\right)} \begin{bmatrix} 1 & -\frac{H_{12}(\omega)}{H_{22}(\omega)} \\ -\frac{H_{21}(\omega)}{H_{11}(\omega)} & 1 \end{bmatrix} \begin{pmatrix} X_1(\omega) \\ X_2(\omega) \end{pmatrix} \quad (5)$$

Expression (5) is an equation for obtaining a time-averaged first voice signal $Y_1(\omega)$ which is a voice emitted by the first sound source S1 and a time-averaged second voice signal $Y_2(\omega)$ which is a voice emitted by the second sound source S2 from the matrix parameters $H(\omega)$, the first power $X_1(n)$, the first voice signal $Y_1(\omega)$, and the second power $X_2(n)$ obtained by Expression (4).

$$\begin{pmatrix} Y_1(\omega, i) \\ Y_2(\omega, i) \end{pmatrix} = \begin{pmatrix} \frac{Y_1(\omega)}{X_1(\omega)} & 0 \\ 0 & \frac{Y_2(\omega)}{X_2(\omega)} \end{pmatrix} \begin{pmatrix} X_1(\omega, i) \\ X_2(\omega, i) \end{pmatrix} \quad (6)$$

Expression (6) is an equation for obtaining a first voice signal $Y_1(\omega,i)$ which changes with time and which is a voice emitted by the first sound source S1 and a second voice signal $Y_2(\omega,i)$ which changes with time and which is a voice emitted by the second sound source S2 from the first voice signal $Y_1(\omega)$, the second voice signal $Y_2(\omega)$, the first power $X_1(n)$, and the second power $X_2(n)$ obtained by Expression (5).

In the present embodiment, values representing the power of the first microphone 2a and the second microphone 2b are used in Expression (4) for obtaining the matrix parameters $H(\omega)$. Therefore, the matrix parameters $H(\omega)$ are obtained with high accuracy. Further, since suppression amounts obtained from the power values are used as instantaneous values in Expressions (5) and (6) for sound source segregation, the embodiment is less susceptible to variation of instantaneous values.

Table 1 shows examples of results of performance evaluation on sound source segregation processes carried out in an actual environment. One process was carried out based on digital voice data obtained using a technique according to the related art, and the other process was carried out based on digital voice data obtained by the signal processing section 4 of the present embodiment.

TABLE 1

|  | Related Art | Present Embodiment |
|---|---|---|
| SDR | 17.78 dB | 23.59 dB |
| NRR | 4.00 dB | 7.09 dB |

Referring to the evaluated factors in FIG. 1, an SDR (Signal to Distortion Ratio) is the ratio of a target sound (signal) to the amount of distortion generated in the target sound as a result of sound source segregation where the target sound is a voice of a speaking person. An SDR value indicates that the target sound has a smaller amount of distortion, the smaller the value is.

An NRR (Noise Reduction Ratio) is a value obtained by subtracting the SN ratio of a target sound before sound source segregation from the SN ratio of the same after sound source segregation, and it indicates the amount of an improvement in the SN ratio achieved by sound source segregation. An NRR value indicates that higher sound source segregating performance is achieved to suppress echoes other than the target sound, the greater the value is.

According to the method in the related art, the voice obtained as a result of sound source segregation had poor quality and included residual echoes. On the contrary, the table indicates that sound source segregation using the signal processing section 4 of the present embodiment reliably segregated echoes from the target sound and achieved high sound source segregating performance.

The SAFIA method according to the related art does not eliminate a stationary noise which steadily occurs with small fluctuations with time. As a result, a voice reproduced according to this method has included stationary noises and has therefore had low sound quality. Such a reproduced voice has also included non-stationary noises in some cases because non-stationary noises can accidentally occur in an actual environment. Possible causes of the generation of stationary noises and non-stationary noises include the fact that instantaneous values have been used to matrix parameters $H(\omega)$ and the fact that the matrix parameters $H(\omega)$ obtained from the instantaneous values are directly obtained. That is, variables for segregating noise components vary with time.

In the present embodiment, Expressions (4) to (6) are expanded into Expressions (7) to (9) as shown below for adaptation to actual environments where stationary noises and non-stationary noises can occur. Expressions (7) to (9) are equations used to eliminate the influence of a stationary noise and a non-stationary noise. Variables of the expressions are similar to those defined for Expressions (1) to (3) used for the above-described sound source segregation process according to the related art.

$$\frac{H_{21}(\omega)}{H_{11}(\omega)} = E \left\| \frac{X_2(\omega) - N_2(\omega)}{X_1(\omega) - N_1(\omega)} > TH_1 \right\| \quad (7)$$

$$\frac{H_{12}(\omega)}{H_{22}(\omega)} = E \left\| \frac{X_1(\omega) - N_1(\omega)}{X_2(\omega) - N_2(\omega)} > TH_2 \right\|$$

Expression (7) is an equation to find the ratio between the second transfer characteristic $H_{21}(\omega)$ and the first transfer characteristic $H_{11}(\omega)$ and the ratio between the third transfer characteristic $H_{12}(\omega)$ and the fourth transfer characteristic $H_{22}(\omega)$.

Matrix parameters $H(\omega)$ obtained by Expression (7) are values changing with time. In Expression (7), a first noise component $N_1(\omega)$ input to the first microphone 2a is subtracted from the first power $X_1(n)$. Similarly, a second noise component $N_2(\omega)$ input to the second microphone 2b is subtracted from the second power $X_2(n)$.

$$\begin{pmatrix} Y_1(\omega) \\ Y_2(\omega) \end{pmatrix} = \quad (8)$$

$$\frac{1}{1 - \left(\frac{H_{21}(\omega)}{H_{11}(\omega)}\right)\left(\frac{H_{12}(\omega)}{H_{22}(\omega)}\right)} \begin{bmatrix} 1 & -\frac{H_{12}(\omega)}{H_{22}(\omega)} \\ -\frac{H_{21}(\omega)}{H_{11}(\omega)} & 1 \end{bmatrix} \begin{pmatrix} X_1(\omega) - N_1(\omega) \\ X_2(\omega) - N_2(\omega) \end{pmatrix}$$

Expression (8) is an equation for obtaining a time-averaged first voice signal $Y_1(\omega)$ which is a voice emitted by the first sound source S1 and a time-averaged second voice signal $Y_2(\omega)$ which is a voice emitted by the second sound source S2 from the matrix parameters $H(\omega)$, the first power $X_1(n)$, the first voice signal $Y_1(\omega)$, and the second power $X_2(n)$ obtained by Expression (7).

$$\begin{pmatrix} Y_1(\omega, i) \\ Y_2(\omega, i) \end{pmatrix} = \begin{pmatrix} \frac{Y_1(\omega)}{X_1(\omega)} & 0 \\ 0 & \frac{Y_2(\omega)}{X_2(\omega)} \end{pmatrix} \begin{pmatrix} X_1(\omega, i) \\ X_2(\omega, i) \end{pmatrix} \qquad (9)$$

Expression (9) is an equation for obtaining a first voice signal $Y_1(\omega,i)$ which changes with time and which is a voice emitted by the first sound source S1 and a second voice signal $Y_2(\omega,i)$ which changes with time and which is a voice emitted by the second sound source S2 from the first voice signal $Y_1(\omega)$, the second voice signal $Y_2(\omega)$, the first power $X_1(n)$, and the second power $X_2(n)$ obtained by Expression (8).

As will be understood from above, Expressions (7) to (9) are calculated with the influence of stationary noises (the first noise component $N_1(\omega)$ and the second noise component $N_2(\omega)$) eliminated. Therefore, the voice signals obtained by the calculations are free from the influence of stationary noise components. According to Expressions (8) and (9) performed for sound source segregation, after stationary noise components are eliminated, multiplication by an inverse matrix is carried out to eliminate non-stationary noise components. Thus, stationary noise components and non-stationary noise components can be eliminated at the same time.

According to the above-described embodiment, an echo canceller for preventing echoes and howling can suppress echoes included in a voice collected from a speaking person with a smaller amount of calculations and in a shorter time compared to techniques based on an adaptive process according to the related art. This is advantageous in that a speaking person can speak without hindrance because the speaking person will not hear echoes of the speech of him- or herself.

Matrix parameters H used for echo cancellation are obtained based on a time-averaged ratio of the power of the first microphone 2a to the power of the second microphone 2b. In comparison to approaches according to the related art in which a power ratio between two microphones is obtained at each instant to obtain matrix parameters H, the sound source segregation process of the present embodiment undergoes less variation of changes in parameters with time. That is, the influence of sounds such as impact sounds or accidental sounds can be eliminated. This is advantageous in that sound source segregation can be accurately carried out using stable matrix parameters H obtained as thus described.

Since power values obtained are averaged, the influence of very large or small instantaneous values can be eliminated. Such a factor also results in the differences in SDR and NRR performance of a reproduced voice shown in the experiment results (Table 1). Specifically, the ratios between instantaneous values in Expression (1) can significantly vary, and the parameters cannot be properly obtained without using a long averaging time. On the contrary, in Expression (4), the power ratio between the first microphone 2a and the second microphone 2b is averaged, and stable parameters can therefore be obtained. The use of such stable parameters results in a significant improvement in sound quality.

According to the present embodiment, when a change occurs in the sound-reinforced communication system, there is no return echo as encountered when an adaptive filter is used. Further, the embodiment may alternatively be implemented using filter banks or Fourier transform. Since methods for reducing the amount of calculations required for those alternative approaches have already proposed, those approaches can therefore be implemented with a smaller amount of calculations compared to the use of an adaptive filter. The present embodiment is not affected by the reverberation time of the rooms where the system is used, and the embodiment is therefore advantageous in that there is no need for an increase in the amount of calculations which is required to accommodate a long reverberation time when an adaptive filter is used.

Further, stationary noise components and echo components can be simultaneously eliminated. It has been difficult to eliminate stationary noise components from collected voices according to the related art. On the contrary, the sound source segregation process of the present embodiment makes it possible to obtain a voice without stationary noise components and echo components. This is advantageous for a person who listens to a speech in that reproduced voices can be clearly heard.

Echo components and stationary noise components can be easily eliminated from collected voices only by placing the second microphone 2b near the speaker 7 acting as the second sound source S2. In this case, only a microphone for a speaking person is required, and a simple system configuration can therefore be provided. The sound source segregation process performed by the sound source segregating portions 42-1 to 42-1024 of the present embodiment is a process performed based on a power difference between the first microphone 2a and the second microphone 2b. Therefore, considerations are paid to parameter errors and stationary noises such that the system can be properly used in an actual environment, and it is therefore possible to obtain reproduction sounds (which are solely the voices of speaking persons) with high quality.

The above embodiment has been described as an example of application of the invention to a television conference system in which voices are bi-directionally transmitted and received. However, the invention may be applied to other systems such as a voice communication system using telephones as long as bi-directional communication is used.

The series of processes of the above-described embodiment may be performed on either hardware or software basis. When the series of processes is performed on a software basis, programs forming desired software may be installed and executed on a computer incorporated in dedicated hardware or a general-purpose computer in which various programs can be installed to execute various functions.

Obviously, the series of processes may alternatively be performed by supplying a recording medium containing a program code of software for implementing the functions of the above-described embodiment recorded therein to a system or apparatus and causing a computer (or a controller such as a CPU) in the system or apparatus to read and execute the program code stored in the recording medium.

For example, the recording medium used to supply a program code in such a case may be a floppy disc, a hard disc, an optical disc, a magneto-optical disc, a CD (compact disc)-ROM (read only memory), a CD-R, a magnetic tape, a non-volatile memory card, or a ROM.

The functions of the above-described embodiment may be implemented not only by the execution of a program code read by a computer but also by the execution of part or whole of actual processes by an OS (operating system) or the like running on a computer based on instructions of the program code.

The invention is not limited to the above-described embodiment, and various alternative configurations may obviously be employed without departing from the spirit of the invention. For example, while the embodiment has a configuration in which the image/voice processing apparatus 1 and 21 are controlled by the controller 31, the timing of transmission and reception of digital image/voice data between the image/voice processing apparatus 1 and 21 may be controlled on a pier-to-pier basis.

It should be understood by those skilled in the art that various modifications, combinations, sub-combinations, and alterations may occur depending on design requirements and other factors insofar as they are within the scope of the appended claims or the equivalents thereof.

What is claimed is:

1. A voice processing apparatus for processing voice signals generated by a plurality of microphones in a situation in which a voice emitted by a first sound source is collected by the plurality of microphones and in which a voice emitted by a second sound source including the voice emitted by the first sound source and collected as an echo component is collected by the plurality of microphones, the apparatus comprising:
a band dividing portion dividing at least a first voice signal and a second voice signal generated by at least a first microphone and a second microphone among the plurality of microphones, respectively, into predetermined frequency bands;
a sound source segregating portion segregating the echo component of the voice emitted by the first sound source included in the voice emitted by the second sound source in each of the predetermined frequency bands of the first and second voice signals thus divided by the band dividing portion based on the power of the voices emitted by the first and second sound sources and collected by the first and second microphones; and
a band synthesis portion synthesizing the first and second voice signals from which the echo component of the first sound source has been segregated by the sound source segregating portion, into a voice signal including the voice emitted by the first sound source and a voice signal including the segregated echo component of the first sound source,
wherein:
the sound source segregating portion determines frequencies $\omega$ of the predetermined frequency bands,
time i when the first microphone and the second microphone collect voices emitted by the first sound source and the second sound source,
a first transfer characteristic $H_{11}(\omega)$ that the first microphone has when collecting the voice emitted by the first sound source, a second transfer characteristic $H_{21}(\omega)$ that the second microphone has when collecting the voice emitted by the first sound source, a third transfer characteristic $H_{12}(\omega)$ that the first microphone has when collecting the voice emitted by the second sound source, and a fourth transfer characteristic $H_{22}(\omega)$ that the second microphone has when collecting the voice emitted by the second sound source, and
first power $X_1(\omega)$ obtained by time-averaging the power of the first microphone and second power $X_2(\omega)$ obtained by time-averaging the power of the second microphone;
the sound source segregating portion obtains the ratio between the first transfer characteristic $H_{11}(\omega)$ and the second transfer characteristic $H_{21}(\omega)$ and the ratio between the third transfer characteristic $H_{12}(\omega)$ and the fourth transfer characteristic $H_{22}(\omega)$ from the following expression:

$$\frac{H_{21}(\omega)}{H_{11}(\omega)} = E\left\|\frac{X_2(\omega)}{X_1(\omega)} > TH_1\right\|$$

$$\frac{H_{12}(\omega)}{H_{22}(\omega)} = E\left\|\frac{X_1(\omega)}{X_2(\omega)} > TH_2\right\|$$

using a function E for finding an average of first values greater than a first threshold $TH_1$, the first values being the second power $X_2(\omega)$ divided by first power $X_1(\omega)$ and another function E for finding an average of second values greater than a second threshold $TH_2$, the values being the second first power $X_1(\omega)$ divided by the second power $X_2(\omega)$;
the sound source segregating portion obtains a time-averaged first voice signal $Y_1(\omega)$ which is a voice emitted by the first sound source and a time-averaged second voice signal $Y_2(\omega)$ which is a voice emitted by the second sound source using the following expression:

$$\begin{pmatrix} Y_1(\omega) \\ Y_2(\omega) \end{pmatrix} = \frac{1}{1 - \left(\frac{H_{21}(\omega)}{H_{11}(\omega)}\right)\left(\frac{H_{12}(\omega)}{H_{22}(\omega)}\right)} \begin{bmatrix} 1 & -\frac{H_{12}(\omega)}{H_{22}(\omega)} \\ -\frac{H_{21}(\omega)}{H_{11}(\omega)} & 1 \end{bmatrix} \begin{pmatrix} X_1(\omega) \\ X_2(\omega) \end{pmatrix};$$

and
the sound source segregating portion obtains a first voice signal $Y_1(\omega,i)$ which changes with time and which is the voice emitted by the first sound source and a second voice signal $Y_2(\omega,i)$ which changes with time and which is the voice emitted by the second sound source using the following expression:

$$\begin{pmatrix} Y_1(\omega, i) \\ Y_2(\omega, i) \end{pmatrix} = \begin{pmatrix} \frac{Y_1(\omega)}{X_1(\omega)} & 0 \\ 0 & \frac{Y_2(\omega)}{X_2(\omega)} \end{pmatrix} \begin{pmatrix} X_1(\omega, i) \\ X_2(\omega, i) \end{pmatrix}.$$

2. A voice processing apparatus for processing voice signals generated by a plurality of microphones in a situation in which a voice emitted by a first sound source is collected by the plurality of microphones and in which a voice emitted by a second sound source including the voice emitted by the first sound source and collected as an echo component is collected by the plurality of microphones, the apparatus comprising:
a band dividing portion dividing at least a first voice signal and a second voice signal generated by at least a first microphone and a second microphone among the plurality of microphones, respectively, into predetermined frequency bands;
a sound source segregating portion segregating the echo component of the voice emitted by the first sound source included in the voice emitted by the second sound source in each of the predetermined frequency bands of the first and second voice signals thus divided by the band dividing portion based on the power of the voices emitted by the first and second sound sources and collected by the first and second microphones; and
a band synthesis portion synthesizing the first and second voice signals from which the echo component of the first sound source has been segregated by the sound source segregating portion, into a voice signal including the voice emitted by the first sound source and a voice signal including the segregated echo component of the first sound source, wherein the sound source segregating portion segregates the first and second voice signals into a stationary signal including a noise component and a non-stationary signal including no noise component, suppresses the noise component included in the stationary signal, and segregates an echo component of the voice emitted by the first sound source included in the voice emitted by the second sound source from the non-stationary signal, and wherein:

the sound source segregating portion determines frequencies ω of the predetermined frequency bands, time i when the first microphone and the second microphone collect voices emitted by the first sound source and the second sound source, a first transfer characteristic $H_{11}(\omega)$ that the first microphone has when collecting the voice emitted by the first sound source, a second transfer characteristic $H_{21}(\omega)$ that the second microphone has when collecting the voice emitted by the first sound source, a third transfer characteristic $H_{12}(\omega)$ that the first microphone has when collecting the voice emitted by the second sound source, and a fourth transfer characteristic $H_{22}(\omega)$ that the second microphone has when collecting the voice emitted by the second sound source, first power $X_1(\omega)$ obtained by time-averaging the power of the first microphone and second power $X_2(\omega)$ obtained by time-averaging the power of the second microphone, and a first stationary signal $N_1(\omega)$ input to the first microphone and a second stationary signal $N_2(\omega)$ input to the second microphone;

the sound source segregating portion obtains the ratio between the first transfer characteristic $H_{11}(\omega)$ and the second transfer characteristic $H_{21}(\omega)$ and the ratio between the third transfer characteristic $H_{12}(\omega))$ and the fourth transfer characteristic $H_{22}(\omega)$ from the following expression:

$$\frac{H_{21}(\omega)}{H_{11}(\omega)} = E\left\| \frac{X_2(\omega)-N_2(\omega)}{X_1(\omega)-N_1(\omega)} > TH_1 \right\|$$

$$\frac{H_{12}(\omega)}{H_{22}(\omega)} = E\left\| \frac{X_1(\omega)-N_1(\omega)}{X_2(\omega)-N_2(\omega)} > TH_2 \right\|$$

using a function E for finding an average of first values greater than a first threshold $TH_1$, the first values being the second power $X_2(\omega)$ minus the second stationary signal $N_2(\omega)$ divided by the first power $X_1(\omega)$ minus the first stationary signal $N_1(\omega)$, and using another function E for finding an average of second values greater than a second threshold $TH_2$, the second values being the first power $X_1(\omega)$ minus the first stationary signal $N_1(\omega)$ divided by the second power $X_2(\omega)$ minus the second stationary signal $N_2(\omega)$;

the sound source segregating portion obtains a time-averaged first voice signal $Y_1(\omega)$ which is the voice emitted by the first sound source and a time-averaged second voice signal $Y_2(\omega)$ which is the voice emitted by the second sound source using the following expression:

$$\begin{pmatrix} Y_1(\omega) \\ Y_2(\omega) \end{pmatrix} =$$

-continued $$\frac{1}{1 - \left(\frac{H_{21}(\omega)}{H_{11}(\omega)}\right)\left(\frac{H_{12}(\omega)}{H_{22}(\omega)}\right)} \begin{bmatrix} 1 & -\frac{H_{12}(\omega)}{H_{22}(\omega)} \\ -\frac{H_{21}(\omega)}{H_{11}(\omega)} & 1 \end{bmatrix} \begin{pmatrix} X_1(\omega)-N_1(\omega) \\ X_2(\omega)-N_2(\omega) \end{pmatrix};$$

the sound source segregating portion obtains a first voice signal $Y_1(\omega, i)$ which changes with time and which is the voice emitted by the first sound source and a second voice signal $Y_2(\omega,i)$ which changes with time and which is the voice emitted by second sound source using the following expression:

$$\begin{pmatrix} Y_1(\omega, i) \\ Y_2(\omega, i) \end{pmatrix} = \begin{pmatrix} \frac{Y_1(\omega)}{X_1(\omega)} & 0 \\ 0 & \frac{Y_2(\omega)}{X_2(\omega)} \end{pmatrix} \begin{pmatrix} X_1(\omega, i) \\ X_2(\omega, i) \end{pmatrix}.$$

3. A voice processing system provided in a plurality of locations for processing voice signals generated by a plurality of microphones in a situation in which a voice emitted from a first sound source is collected by the plurality of microphones and in which a voice emitted from a second sound source including the voice emitted by the first sound source and collected as an echo component is collected by the plurality of microphones, the system comprising:

a band dividing portion dividing at least a first voice signal and a second voice signal generated by at least a first microphone and a second microphone among the plurality of microphones, respectively, into predetermined frequency bands;

a sound source segregating portion segregating the echo component of the voice emitted by the first sound source included in the voice emitted by the second sound source in each of the predetermined frequency bands of the first and second voice signals thus divided by the band dividing portion based on the power of the voices emitted by the first and second sound sources and collected by the first and second microphones; and a band synthesis portion synthesizing the first and second voice signals from which the echo component of the first sound source has been segregated by the sound source segregating portion into a voice signal including the voice emitted by the first sound source and a voice signal including the segregated echo component of the first sound source, wherein:

the sound source segregating portion determines frequencies ω of the predetermined frequency bands, time i when the first microphone and the second microphone collect voices emitted by the first sound source and the second sound source, a first transfer characteristic $H_{11}(\omega)$ that the first microphone has when collecting the voice emitted by the first sound source, a second transfer characteristic $H_{21}(\omega)$ that the second microphone has when collecting the voice emitted by the first sound source, a third transfer characteristic $H_{12}(\omega)$ that the first microphone has when collecting the voice emitted by the second sound source, and a fourth transfer characteristic $H_{22}(\omega)$ that the second microphone has when collecting the voice emitted by the second sound source, and first power $X_1(\omega)$ obtained by time-averaging the power of the first microphone and second power $X_2(\omega)$ obtained by time-averaging the power of the second microphone;

the sound source segregating portion obtains the ratio between the first transfer characteristic $H_{11}(\omega)$ and the second transfer characteristic $H_{21}(\omega)$ and the ratio between the third transfer characteristic $H_{12}(\omega)$) and the fourth transfer characteristic $H_{22}(\omega)$ from the following expression:

$$\frac{H_{21}(\omega)}{H_{11}(\omega)} = E\left\|\frac{X_2(\omega)}{X_1(\omega)} > TH_1\right\|$$

$$\frac{H_{12}(\omega)}{H_{22}(\omega)} = E\left\|\frac{X_1(\omega)}{X_2(\omega)} > TH_2\right\|$$

using a function E for finding an average of first values greater than a first threshold $TH_1$, the first values being the second power $X_2(\omega)$ divided by first power $X_1(\omega)$ and another function E for finding an average of second values greater than a second threshold $TH_2$, the second values being the first power $X_1(\omega)$ divided by the second power $X_2(\omega)$;

the sound source segregating portion obtains a time-averaged first voice signal $Y_1(\omega)$ which is a voice emitted by the first sound source and a time-averaged second voice signal $Y_2(\omega)$ which is a voice emitted by the second sound source using the following expression:

$$\begin{pmatrix} Y_1(\omega) \\ Y_2(\omega) \end{pmatrix} = \frac{1}{1 - \left(\frac{H_{21}(\omega)}{H_{11}(\omega)}\right)\left(\frac{H_{12}(\omega)}{H_{22}(\omega)}\right)} \begin{bmatrix} 1 & -\frac{H_{12}(\omega)}{H_{22}(\omega)} \\ -\frac{H_{21}(\omega)}{H_{11}(\omega)} & 1 \end{bmatrix} \begin{pmatrix} X_1(\omega) \\ X_2(\omega) \end{pmatrix};$$

and the sound source segregating portion obtains a first voice signal $Y_1(\omega,i)$ which changes with time and which is the voice emitted by the first sound source and a second voice signal $Y_2(\omega,i)$ which changes with time and which is the voice emitted by the second sound source using the following expression:

$$\begin{pmatrix} Y_1(\omega, i) \\ Y_2(\omega, i) \end{pmatrix} = \begin{pmatrix} \frac{Y_1(\omega)}{X_1(\omega)} & 0 \\ 0 & \frac{Y_2(\omega)}{X_2(\omega)} \end{pmatrix} \begin{pmatrix} X_1(\omega, i) \\ X_2(\omega, i) \end{pmatrix}.$$

4. A voice processing system according to claim 3, wherein:
the second sound source is a speaker; and
a voice emitted by the second sound source provided in a first location of the plurality of locations includes a voice collected in a second location where the voice collected in the first location is emitted.

5. A voice processing program code stored in a non-transitory recording medium for processing voice signals generated by a plurality of microphones in a situation in which a voice emitted by a first sound source is collected by the plurality of microphones and in which a voice emitted by a second sound source including the voice emitted by the first sound source and collected as an echo component is collected by the plurality of microphones, the program code comprising:
a band dividing process dividing at least a first voice signal and a second voice signal generated by at least a first microphone and a second microphone among the plurality of microphones, respectively, into predetermined frequency bands;

a sound source segregating process segregating the echo component of the voice emitted by the first sound source included in the voice emitted by the second sound source in each of the predetermined frequency bands of the first and second voice signals divided by the band dividing process based on the power of the voices emitted by the first and second sound sources and collected by the first and second microphones; and a band synthesis process synthesizing the first and second voice signals from which the echo component of the first sound source has been segregated by the sound source segregating process into a voice signal including the voice emitted by the first sound source and a voice signal including the segregated echo component of the first sound source, wherein:

the sound source segregating process determines frequencies $\omega$ of the predetermined frequency bands, time i when the first microphone and the second microphone collect voices emitted by the first sound source and the second sound source, a first transfer characteristic $H_{11}(\omega)$ that the first microphone has when collecting the voice emitted by the first sound source, a second transfer characteristic $H_{21}(\omega)$ that the second microphone has when collecting the voice emitted by the first sound source, a third transfer characteristic $H_{12}(\omega)$ that the first microphone has when collecting the voice emitted by the second sound source, and a fourth transfer characteristic $H_{22}(\omega)$ that the second microphone has when collecting the voice emitted by the second sound source, and first power $X_1(\omega)$ obtained by time-averaging the power of the first microphone and second power $X_2(\omega)$ obtained by time-averaging the power of the second microphone;

the sound source segregating process obtains the ratio between the first transfer characteristic $H_{11}(\omega)$ and the second transfer characteristic $H_{21}(\omega)$ and the ratio between the third transfer characteristic $H_{12}(\omega)$ and the fourth transfer characteristic $H_{22}(\omega)$ from the following expression:

$$\frac{H_{21}(\omega)}{H_{11}(\omega)} = E\left\|\frac{X_2(\omega)}{X_1(\omega)} > TH_1\right\|$$

$$\frac{H_{12}(\omega)}{H_{22}(\omega)} = E\left\|\frac{X_1(\omega)}{X_2(\omega)} > TH_2\right\|$$

using a function E for finding an average of first values greater than a first threshold $TH_1$, the first values being the second power $X_2(\omega)$ divided by first power $X_1(\omega)$ and another function E for finding an average second of values greater than a second threshold $TH_2$, the second values being the first power $X_1(\omega)$ divided by the second power $X_2(\omega)$;

the sound source segregating process obtains a time-averaged first voice signal $Y_1(\omega)$ which is a voice emitted by the first sound source and a time-averaged second voice signal $Y_2(\omega)$ which is a voice emitted by the second sound source using the following expression:

$$\begin{pmatrix} Y_1(\omega) \\ Y_2(\omega) \end{pmatrix} = \frac{1}{1 - \left(\frac{H_{21}(\omega)}{H_{11}(\omega)}\right)\left(\frac{H_{12}(\omega)}{H_{22}(\omega)}\right)} \begin{bmatrix} 1 & -\frac{H_{12}(\omega)}{H_{22}(\omega)} \\ -\frac{H_{21}(\omega)}{H_{11}(\omega)} & 1 \end{bmatrix} \begin{pmatrix} X_1(\omega) \\ X_2(\omega) \end{pmatrix};$$

and the sound source segregating process obtains a first voice signal $Y_1(\omega, i)$ which changes with time and which is the voice emitted by the first sound source and a second voice signal $Y_2(\omega,i)$ which changes with time and which is the voice emitted by the second sound source using the following expression:

$$\begin{pmatrix} Y_1(\omega, i) \\ Y_2(\omega, i) \end{pmatrix} = \begin{pmatrix} \frac{Y_1(\omega)}{X_1(\omega)} & 0 \\ 0 & \frac{Y_2(\omega)}{X_2(\omega)} \end{pmatrix} \begin{pmatrix} X_1(\omega, i) \\ X_2(\omega, i) \end{pmatrix}.$$

\* \* \* \* \*